United States Patent [19]

Niemeier

[11] Patent Number: 5,574,482

[45] Date of Patent: Nov. 12, 1996

[54] METHOD FOR DATA INPUT ON A TOUCH-SENSITIVE SCREEN

[76] Inventor: Charles J. Niemeier, 1239 Mandarin Dr., Sunnyvale, Calif. 94087

[21] Appl. No.: 550,569

[22] Filed: Oct. 31, 1995

Related U.S. Application Data

[63] Continuation of Ser. No. 245,229, May 17, 1994, abandoned.

[51] Int. Cl.$^6$ ....................................................... G09G 3/02
[52] U.S. Cl. .......................... 345/173; 345/168; 345/172
[58] Field of Search ..................................... 345/173, 174, 345/175, 156, 168, 169, 171, 172; 341/22, 23, 31, 33; 178/18, 19

[56] References Cited

U.S. PATENT DOCUMENTS

| | | | |
|---|---|---|---|
| 4,211,497 | 7/1980 | Montgomery | 400/486 |
| 4,709,387 | 11/1987 | Masuda | 345/172 |
| 4,725,694 | 2/1988 | Auer et al. | 345/173 |
| 5,128,672 | 7/1992 | Kaehler | 341/23 |
| 5,243,331 | 9/1993 | McCansland et al. | 345/172 |
| 5,288,158 | 2/1994 | Matiar | 345/172 |
| 5,319,386 | 6/1994 | Gunn et al. | 345/173 |

OTHER PUBLICATIONS

Montgomery, "Bringing Manual Input into the 20th Century", *Computer*, Mar. 1982, pp. 11–18.

*Primary Examiner*—Kee Mei Tung
*Assistant Examiner*—Doon Chow

[57] ABSTRACT

A method of input programmed to operate on a representation of a keyboard appearing on a touch-sensitive screen in which letters are made temporarily available to the user based on studies of frequency of occurrence and sequence in the language that may then be selected for input by a sliding motion of an input device. The user slides an input device from the initially selected letter into the area representing any of the temporarily available keys, inputting any of the letters represented thereon. The process of selecting by touch and slide may be repeated as desired by the user. A method of capitalization is provided by touching the screen with an input device on the background area of the keyboard outside of the area representing the key or a letter and then sliding the input device into the area representing the key of the letter. A method of spacing is provided by a sliding movement of an input device from within the area representing the key of the last character before the desired space into the background area of the keyboard outside of the area of the key and then lifting the input device from the surface of the screen.

11 Claims, 7 Drawing Sheets

METHOD FOR DATA INPUT ON A TOUCH-SENSITIVE SCREEN

This is a continuation of application Ser. No. 08/245,229 filed May 17, 1994, now abandoned

BACKGROUND—FIELD OF INVENTION

This invention pertains to inputting on a virtual keyboard on a touch-sensitive screen of a computer using a sliding method with additional temporary keys that display the predicted next character needed for input.

DESCRIPTION OF PRIOR ART

The current method for inputting data using touch-sensitive computer screens involves touching or tapping with a finger or a hand-held device called a stylus on a representation of a keyboard as it appears on the screen. These representations of keyboards are commonly referred to as virtual keyboards. They are obviously different from the keyboards of typewriters and computer keyboards in that they have no moving parts actuated by depression caused by the user's fingers. However, these on-screen keyboards do have certain features of mechanical keyboards. The letters on the represented keys are usually arranged in the pattern known as the "qwerty" layout. The so-called qwerty layout is the one in traditional use for typewriters and computer keyboards. The name comes from the letter arrangement on the top alphabetic row, the first six letters being q- w- e- r- t- y. The keys as represented on the computer screen are fixed, and input is performed by individual touches or taps on them, similar to the operation of actual keyboards. The user touches or taps each letter individually on the representation of its key as displayed on the screen, selecting the letter for input. Examples of virtual keyboards may be seen on hand-held computer devices called personal digital assistants.

U.S. Pat. No. 4,211,497 to Montgomery (1980) discloses a data input system on an apparatus keyboard with a substantially smooth surface to allow a sliding movement of the fingers over keys. The keys themselves are arranged such that the most often used keys are situated in the most readily accessible locations with regard to the fingers of the operator, and with keys which are frequently used in sequence. The key arrangements comprise trigrams and digraphs, as well as individual words, and has characters used frequently in sequence positioned adjacent to one another. Studies of the English language were used to analyze combinations of letters and the frequency of occurrence. The keys may be arranged along paths corresponding to the natural movement of the fingers, hands, and arms of the operator. Montgomery's keyboard is an apparatus claim, and does not use a touch-sensitive screen.

This same patent (Montgomery) displays several layouts of keyboards and arrangements of letters of the alphabet and space bars, as well as electrical specifications of the keyboard unit.

The problems with Montgomery's keyboards include:

(a) the layouts, which are different from the "qwerty" layout. Use of any of Montgomery's layouts requires a learning commitment and time investment on the part of the user, who most likely has already been trained on the qwerty keyboard.

(b) the fixed arrangement of keys. Whichever of Montgomery's layouts is chosen to be built, it is inseparable from a fixed apparatus. The apparatus is separate from the computer screen, and used in reference to the position of the user's body, arms and hands. Once built, it is fixed, a limitation of the apparatus to which Montgomery's layouts are intrinsically tied.

(c) the smooth key design. Although the smooth design of the apparatus is needed to facilitate sliding of the fingers, it also means that there is no tactile "feedback" to the user while typing, a psychological barrier to the learning process.

In U.S. Pat. No. 4,725,694 to Auer, et al, (1988), a simulated keyboard is represented on a touch-sensitive display used as a computer terminal. Auer permits a variety of simulated standard keyboards to be presented on screen, but the arrangement changes only when the user touches a special key area corresponding to a shift or control key that causes the key labels or key images to be altered. This effectively limits the keyboards to a series of fixed key arrangements, each called up after the required additional step of touching the shift or control keys represented on the currently displayed keyboard. A different approach is taken in U.S. Pat. No. 5,128,672 to Kaehler (1992). In an attempt to reduce the size of the displayed keyboard or touch pad for use on smaller, hand-held computer devices, Kaehler reduces the number of displayed letter keys, arranges the characters based on the frequency of the particular characters in a language or application, and then predicts and displays the letter keys needed by the user within a variety of predefined sets of key images. Although each key can display different characters, only one character is presented at a time on each key. This means that, despite the predictive capabilities, there are times during input when the user must manually change the character set layout because the needed letter is not on screen. This is done by touching a "Flip" key assigned to change the letter layout to another predefined layout. Also, each character is displayed on only one key location whenever that character is presented. While this aides the user in learning the layout location of the letters, it precludes a sliding method of input. The next needed letter, even if on the current layout, may be to far from the preceding letter to make practical the selection by sliding without touching another undesired letter. This is especially true on a small screen, where space is limited.

Note: In the following discussions, all references to key or keys mean the representation of a key.

SUMMARY OF THE INVENTION

This invention is a process of inputting data using a representation of a keyboard on a touch-sensitive screen. The input operation is carried out by selecting characters on the represented keyboard with an input device or finger. The innovation of this invention is that input is facilitated by a sliding or wiping motion through available letters, letter combinations, parts of words, or whole words. To increase the effectiveness of this sliding input method, temporarily active keys appear on the screen in close proximity to the standard keys, providing choices for immediate input by sliding through them without having to lift the input device and move to a different key. Tapping with a stylus input device or finger on representations of keys showing characters is the current state of the art for on-screen touch-sensitive keyboards. With this invention, tapping is reduced to a minimum.

Another ramification of the use of temporary keys is the ability to have the letters on the temporary keys change during input based on the next letters according to a word list, such as a dictionary.

In addition, this invention provides for two other new techniques. Capitalization of letters and spacing are achieved using a wiping motion of an input device.

OBJECTS AND ADVANTAGES OF THE INVENTION

Studies of the English language have been used for this invention to determine the best possible choices and arrangement of letters on the temporarily active keys. The studies used are *Secret and Urgent* by Fletcher Pratt, published by Bobbs-Merrill Co., 1939, which lists digraphs, trigrams and frequently used words in the English language, and *Computational Analysis of Present-Day American English* by Henry Kucera and W. Nelson Francis, published by Brown University Press, 1967, which also lists the highest frequency words in English.

Accordingly, several objects and advantages of the method are:

(a) directly and immediately to present to the user of an on-screen touch-sensitive keyboard additional, temporary keys with the most probable next letters, combination of letters, parts of words, or words;

(b) to provide these keys so that they may be selected by the wiping motion of a stylus or finger, in order to expedite and facilitate input;

(c) to provide a method by which the user can capitalize a letter, without having to tap a separate and distinct key for that function. This is made possible by allowing the user to put the stylus or finger down on the background area or the keyboard outside of a key representing the letter to be capitalized and then wiping into the key area of the letter;

(d) to provide a method by which the user can input spaces after letters or words by wiping into the background area of the keyboard outside of the key of the last letter or character inputted;

(e) to give a smooth, more writing-like method of input as opposed to: 1.) the tapping out of letters individually with stylus or finger, and 2. ) the wiping on a smooth apparatus keyboard such as Montgomery's that provides no tactile feedback to the user.

Further objects and advantages of the method will become apparent from consideration of the drawings and ensuing description.

BRIEF DESCRIPTION OF THE DRAWINGS

The present invention will be more fully understood by reference to the following detailed descriptions thereof when read in conjunction with the attached drawings, and wherein.

For the purposes of FIGS. 4 through 30, the qwerty layout illustrates how the temporarily active keys of the method appear to the user upon selection of each letter of the alphabet with an input device. These Figures show the keyboard layout of FIG. 1 when individual letter keys are touched, bringing onto the screen temporary keys that differ from the basic keys. These temporary keys, placed in close proximity to the initially touched key, offer additional choices for immediate selection by a sliding motion of the stylus or finger over the temporary keys.

REFERENCE NUMERALS IN DRAWINGS

40 a representation of a touch-sensitive screen

50 a representative input device for use on a touch sensitive screen

60 a representation of a key containing a character on a keyboard arrangement

70 a representation of a temporarily active key containing a letter

80 a representation of the area outside of a key commonly known to as the background of the keyboard.

DESCRIPTION OF INVENTION

A typical embodiment of the method is herein disclosed. (The art for producing a touch-sensitive screen is well known and is not claimed.) This method allows a representation of a keyboard appearing on a computer's touch-sensitive screen 40 to be manipulated by the wiping motion of an input device 50 or a finger or fingers. One or several keyboard layouts produce a new choice of key or keys 70 that temporarily appear in close proximity to a selected key 60. Temporary keys 70 that appear (FIGS. 4 through 29, and 32) are visually differentiated in some manner from the basic arrangement of keys 60, and display a letter or letters that comprise digraphs and trigrams, parts of words, words or characters that are frequently used in the English language. The letters that appear on the temporarily active keys 70 may also change during input based on letter sequences found in a word list known as a dictionary.

More specifically, the steps for producing the preferred embodiment of the sliding process of letter input, capitalization, and spacing is as follows:

(a) display a keyboard arrangement on a touch-sensitive screen, consisting of at least one key individual to each of the standard letters of the alphabet;

(b) is input device within the area of a key? If yes, input letter and display temporary letter keys in close proximity to touched key; if no, turn on capitalization;

(c) is device picked up from within area of a key? If yes, turn off capitalization and return to (b). If no, wait for movement of device and continue;

(d) is device picked up from background area of keyboard arrangement? if yes, and if a letter has been inputted, input a space and return to (b); if no, wait for movement of device and return to (b).

Operation: An input device 50 or finger is used to first select, on a touch sensitive computer screen 40, an individual representation of a key 60 having on it a representation of a letter or character. The device is then used to slide over the additional available active letters 70 . More than one temporary key can be selected by keeping the input device on the screen and continuing the wipe to the next desired active key area. Lifting of the input device 50 from the screen ends the current wiping process. Capitalization of a letter is caused by first placing the input device 50 onto the area 80 commonly known as the background of the keyboard outside of the representation of the key 60 containing the letter to be capitalized and then sliding the device 50 into the area of the key 60. The wipe from within the representation of any key 60 or 70 may continue onto the background area of the keyboard 80 causing the input of a space. This selection and wiping process is repeated as the method of input.

Studies of the frequency of words and the sequence of letters in the language are used in deciding which ones to display temporarily 70 around a letter 60 on the basic key arrangement. The availability of temporary keys 70 containing related letters can be used with any layout of letters on the basic keyboard. A number of layouts could be provided for the user to choose from: alphabetic arrangement, "qwerty", or some other arrangement. While using any of these basic arrangements of letters on the keyboard, the user would also have available the letters next most likely to be needed for input.

FIGS. 4 through 32 show the preferred embodiments of my invention.

Figure 1:
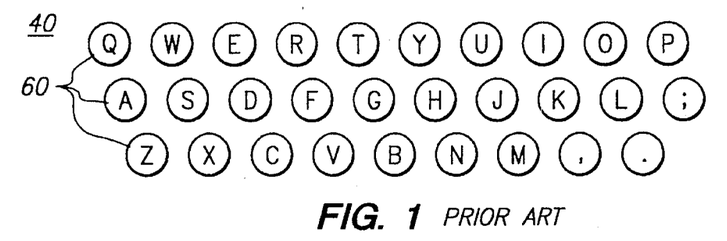
FIG. 1 is a representation of a qwerty keyboard for entering in information with an input device on any touch-sensitive screen on a computer, personal digital assistant, personal communicator, or hand-held device.
Figure 2:
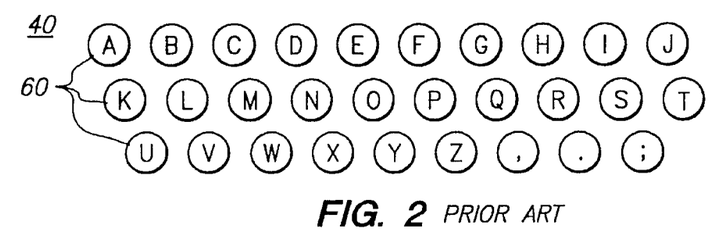
FIG. 2 is a representation of an alphabetically arranged keyboard for entering in information with an input device on any touch-sensitive screen on a computer, personal digital assistant, personal communicator, or handheld device.
Figure 3:
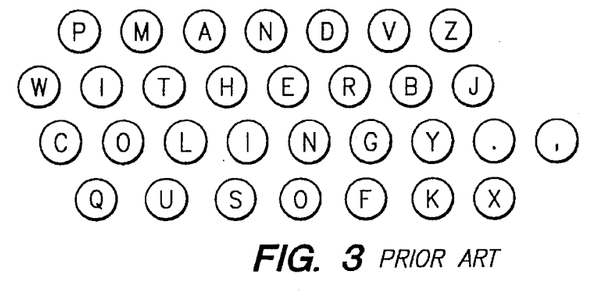
FIG. 3 shows a prior art keyboard layout of Edward B. Montgomery.
Figure 4:
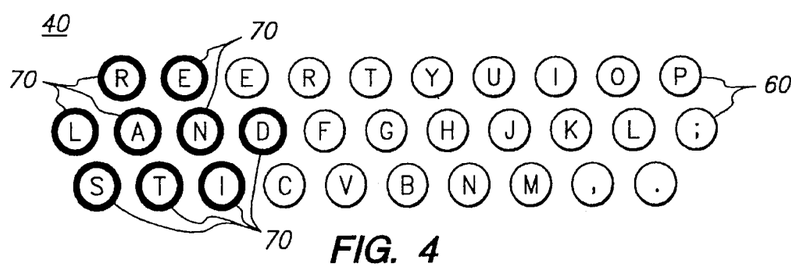

FIG. 4 shows a qwerty keyboard as it appears when letter a is touched. The temporary keys 70, shown in heavy outline, can be rapidly selected by a continuous wiping motion from within the area of letter a to within the area of any of the temporary keys.

Figure 5:
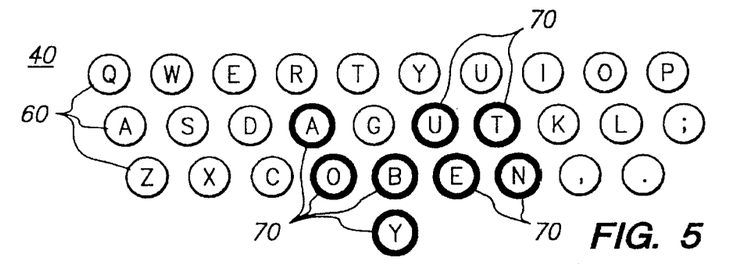

FIG. 5 shows a qwerty keyboard as it appears when letter b is touched. The temporary keys 70, shown in heavy outline, can be rapidly selected with a continuous wiping motion from within the area of letter b to within the area of any of the temporary keys.

Figure 6:
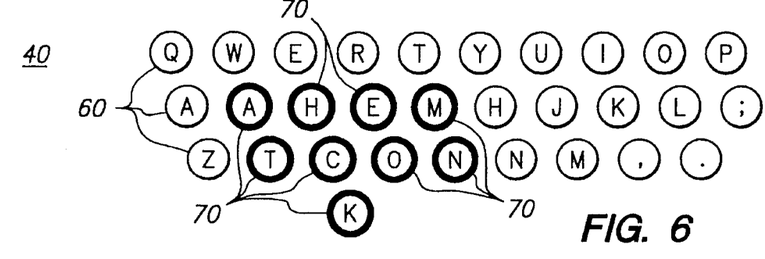

FIG. 6 shows a qwerty keyboard as it appears when letter c is touched. The temporary keys 70, shown in heavy outline, can be rapidly selected by a continuous wiping motion from within the area of letter c to within the area of any of the temporary keys.

Figure 7:
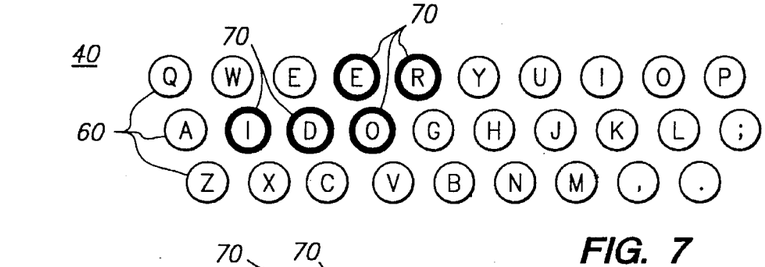

FIG. 7 shows a qwerty keyboard as it appears when letter d is touched. The temporary keys 70, shown in heavy outline, can be rapidly selected by a continuous wiping motion from within the area of letter d to within the area of any of the temporary keys.

Figure 8:
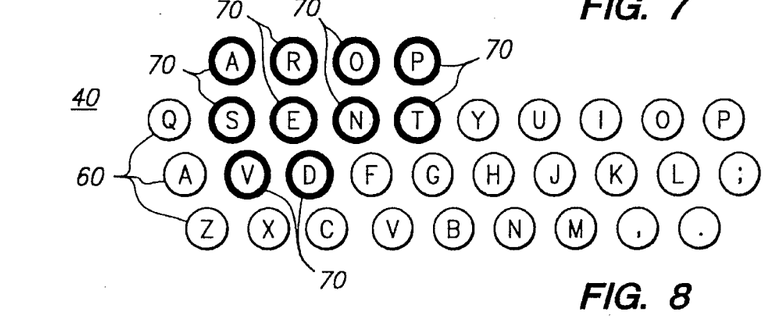

FIG. 8 shows a qwerty keyboard as it appears when letter e is touched. The temporary keys 70, shown in heavy outline, can be rapidly selected by a continuous wiping motion from within the area of letter e to within the area of any of the temporary keys.

Figure 9:
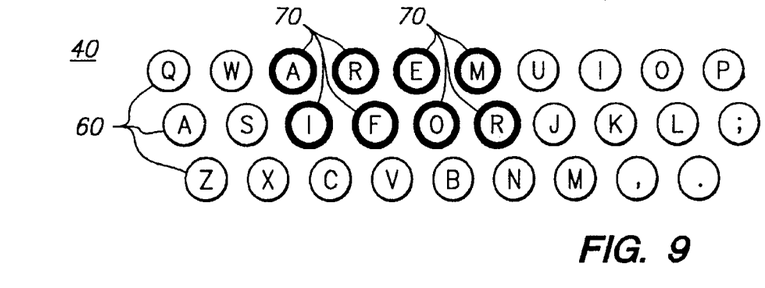

FIG. 9 shows a qwerty keyboard as it appears when letter f is touched. The temporary keys 70, shown in heavy outline can be rapidly selected by a continuous wiping motion from within the area of letter f to within the area of any of the temporary keys.

Figure 10:
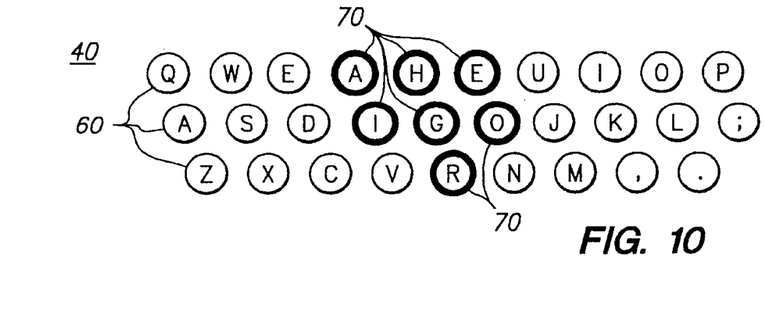

FIG. 10 shows a qwerty keyboard as it appears when letter g is touched. The temporary keys 70, shown in heavy outline, can be rapidly selected by a continuous wiping motion from within the area of letter g to within the area of any of the temporary keys.

Figure 11:
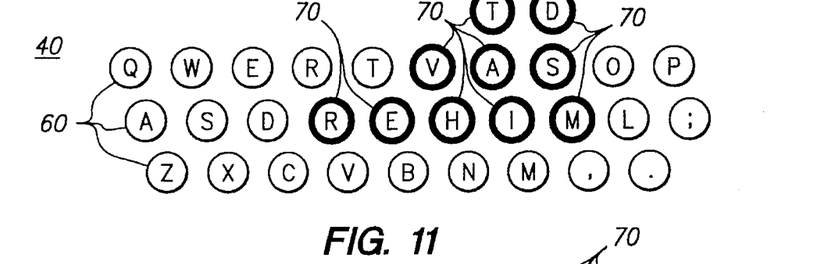

FIG. 11 shows a qwerty keyboard as it appears when letter h is touched. The temporary keys 70, shown in heavy outline can be rapidly selected by a continuous wiping motion from within the area of letter h to within the area of any of the temporary keys.

Figure 12:
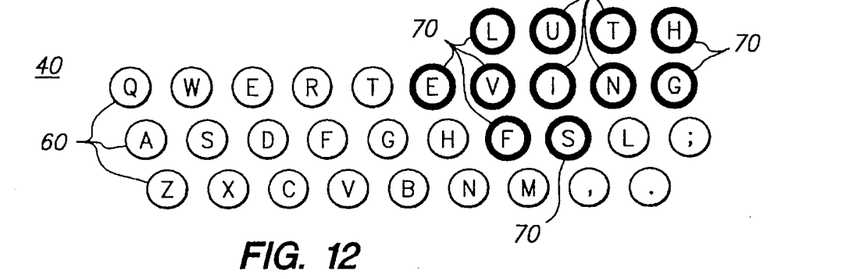

FIG. 12 shows a qwerty keyboard as it appears when letter i is touched. The temporary keys 70, shown in heavy outline can be rapidly selected by a continuous wiping motion from within the area of letter i to within the area of any of the temporary keys.

Figure 13:
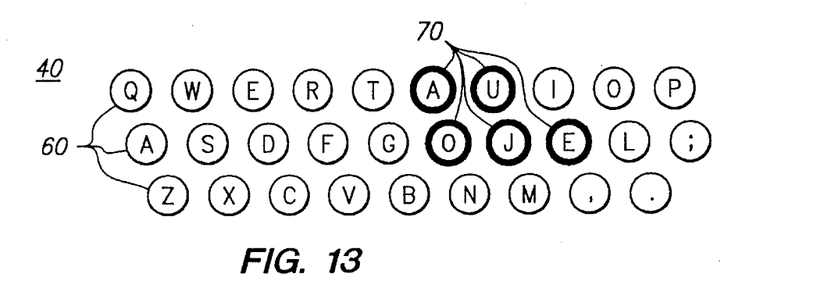

FIG. 13 shows a qwerty keyboard as it appears when letter j is touched. The temporary keys 70, shown in heavy outline can be rapidly selected by a continuous wiping motion from within the area of letter j to within the area of any of the temporary keys.

Figure 14:
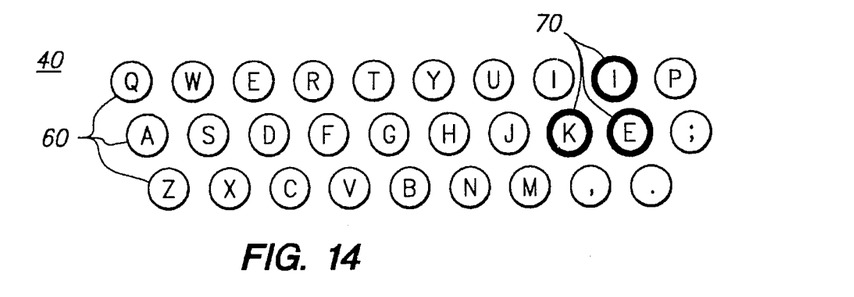

FIG. 14 shows a qwerty keyboard as it appears when letter k is touched. The temporary keys 70, shown in heavy outline can be rapidly selected by a continuous wiping motion from within the area of letter k to within the area of any of the temporary keys.

Figure 15:
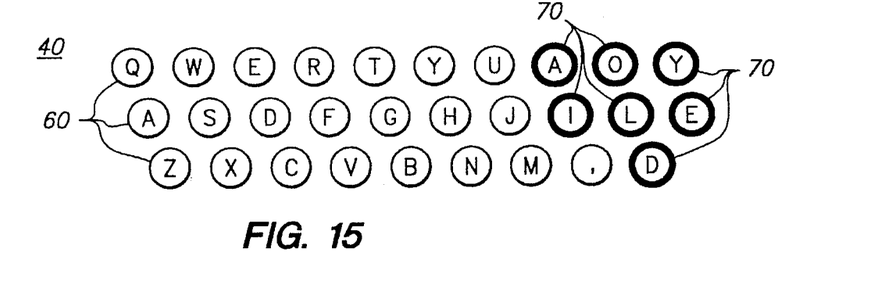

FIG. 15 shows a qwerty keyboard as it appears when letter l is touched. The temporary keys 70, shown in heavy outline, can be rapidly selected by a continuous wiping motion from within the area of letter l to within the area of any of the temporary keys.

Figure 16:
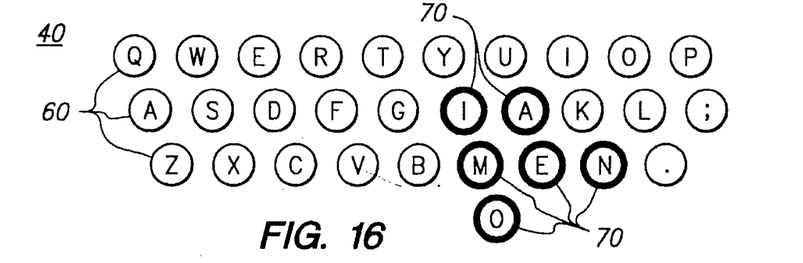

FIG. 16 shows a qwerty keyboard as it appears when letter m is touched. The temporary keys 70, shown in heavy outline can be rapidly selected by a continuous wiping motion from within the area of letter m to within the area of any of the temporary keys.

Figure 17:
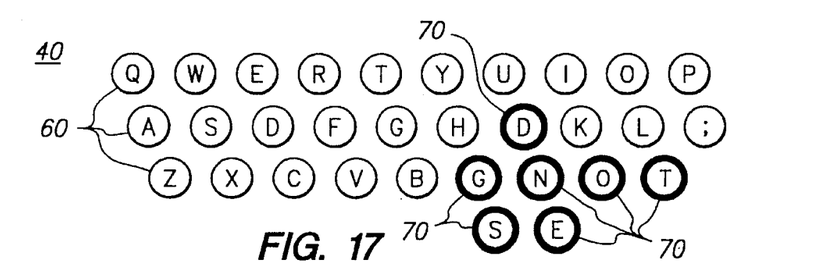

FIG. 17 shows a qwerty keyboard as it appears when letter n is touched. The temporary keys 70, shown in heavy outline can be rapidly selected by a continuous wiping motion from within the area of letter n to within the area of any of the temporary keys.

Figure 18:
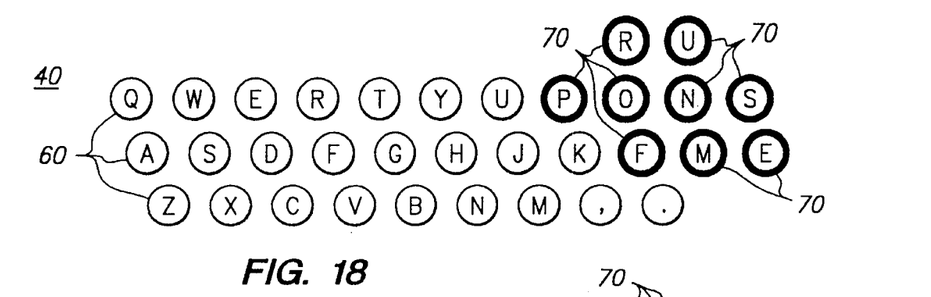

FIG. 18 shows a qwerty keyboard as it appears when letter o is touched. The temporary keys 70, shown in heavy outline, can be rapidly selected by a continuous wiping motion from within the area of letter o to within the area of any of the temporary keys.

Figure 19:
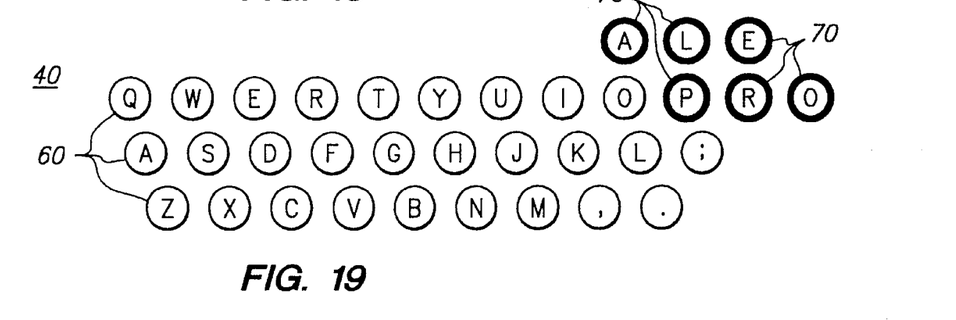

FIG. 19 shows a qwerty keyboard as it appears when letter p is touched. The temporary keys 70, shown in heavy outline, can be rapidly selected by a continuous wiping motion from within the area of letter p to within the area of any of the temporary keys.

Figure 20:
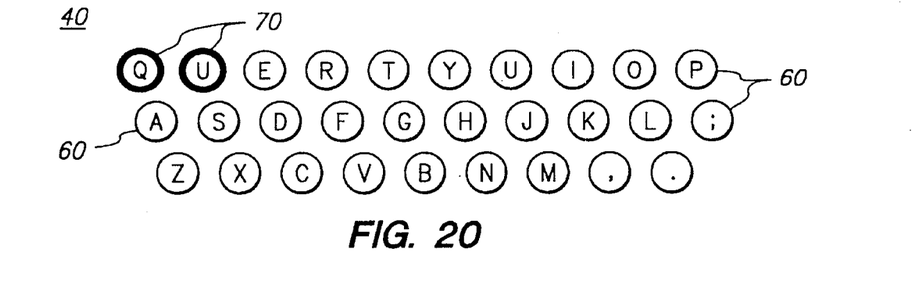

FIG. 20 shows a qwerty keyboard as it appears when letter q is touched. The temporary keys 70, shown in heavy outline can be rapidly selected by a continuous wiping motion from within the area of letter q to within the area of any of the temporary keys.

Figure 21:
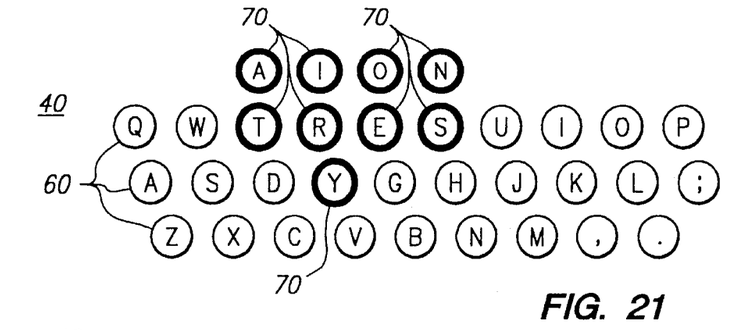

FIG. 21 shows a qwerty keyboard as it appears when letter r is touched. The temporary keys 70, shown in heavy outline, can be rapidly selected by a continuous wiping motion from within the area of letter r to within the area of any of the temporary keys 70, shown in heavy outline can b keys.

Figure 22:
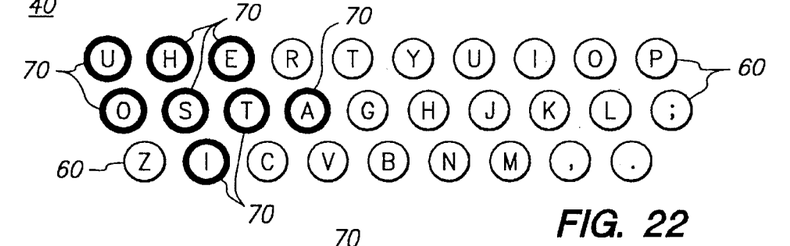

FIG. 22 shows a qwerty keyboard as it appears when letter s is touched. The temporary keys 70, shown in heavy outline, can be rapidly selected by a continuous wiping motion from within the area of letter s to within the area of any of the temporary keys.

Figure 23:
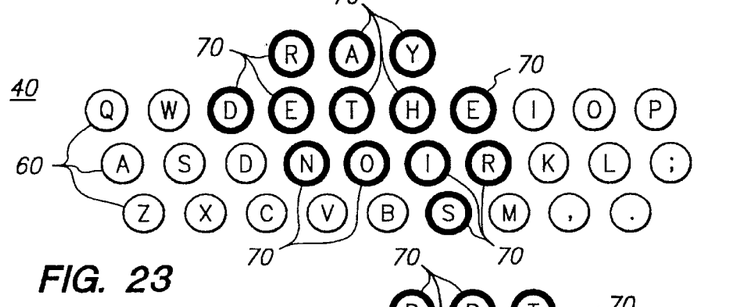

FIG. 23 shows a qwerty keyboard as it appears when letter t is touched. The temporary keys 70, shown in heavy outline can be rapidly selected by a continuous wiping motion from within the area of letter t to within the area of any of the temporary keys.

Figure 24:
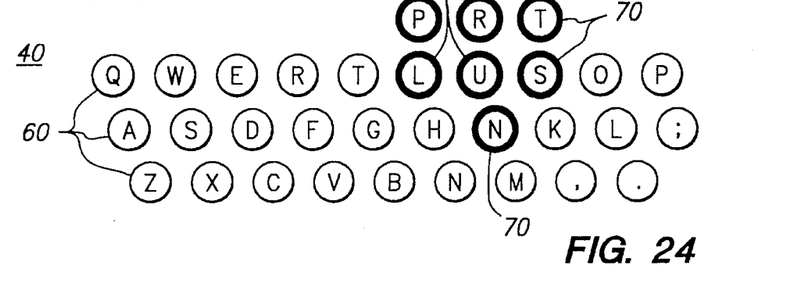

FIG. 24 shows a qwerty keyboard as it appears when letter u is touched. The temporary keys 70, shown in heavy outline, can be rapidly selected by a continuous wiping motion from within the area of letter u to within the area of any of the temporary keys.

Figure 25:
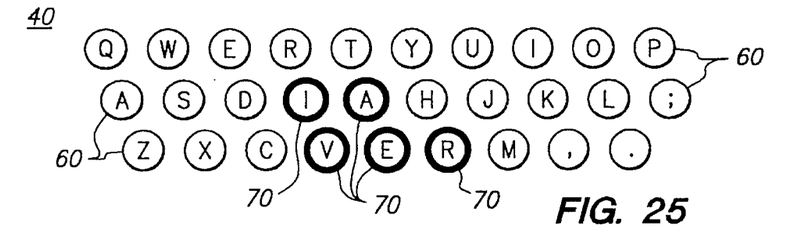

FIG. 25 shows a qwerty keyboard as it appears when letter v is touched. The temporary keys 70, shown in heavy outline can be rapidly selected by a continuous wiping motion from within the area of letter v to within the area of any of the temporary keys.

Figure 26:
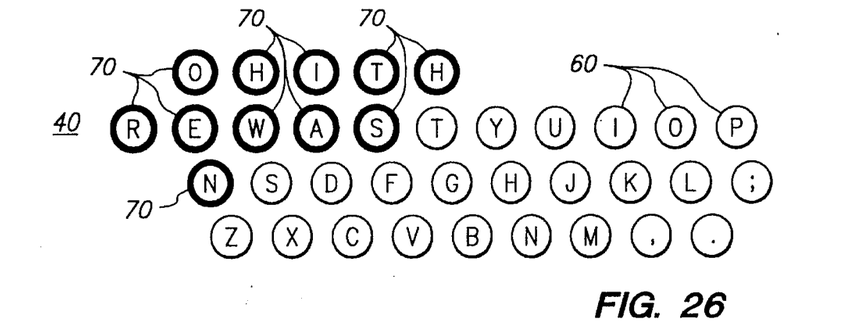

FIG. 26 shows a qwerty keyboard as it appears when letter w is touched. The temporary keys 70, shown in heavy outline, can be rapidly selected by a continuous wiping motion from within the area of letter w to within the area of any of the temporary keys.

Figure 27:
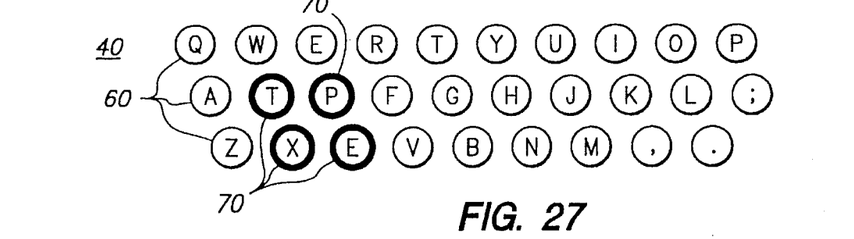

FIG. 27 shows a qwerty keyboard as it appears when letter x is touched. The temporary keys 70, shown in heavy outline, can be rapidly selected by a continuous wiping motion from within the area of letter x to within the area of any of the temporary keys.

Figure 28:
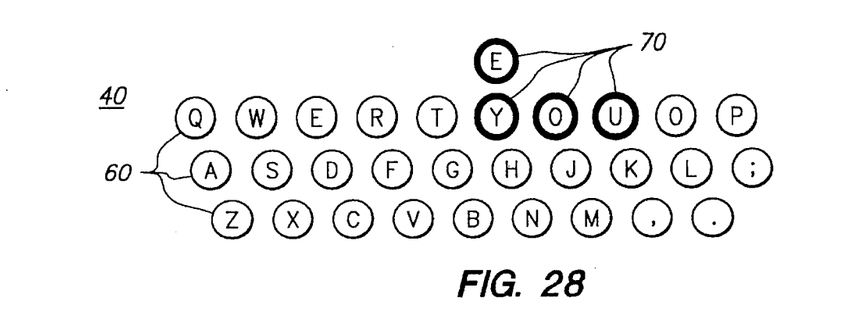

FIG. 28 shows a qwerty keyboard as it appears when letter y is touched. The temporary keys 70, shown in heavy outline, can be rapidly selected by a continuous wiping motion from within the area of letter y to within the area of any of the temporary keys.

Figure 29:
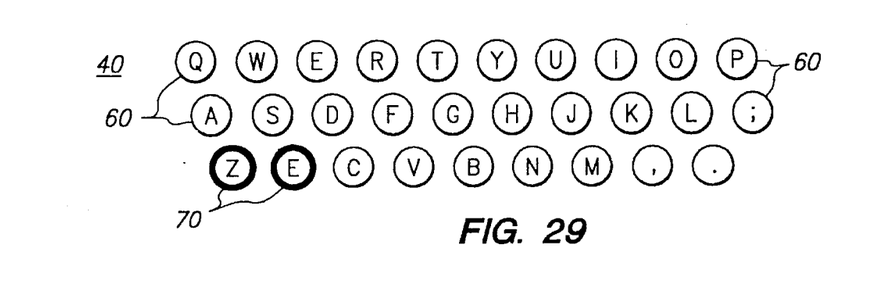

FIG. 29 shows a qwerty keyboard as it appears when letter z is touched. The wiping motion from within the area of letter z to within the area of any of the temporary keys 70, shown in heavy outline, can be rapidly selected by a continuous keys.

Figure 30:
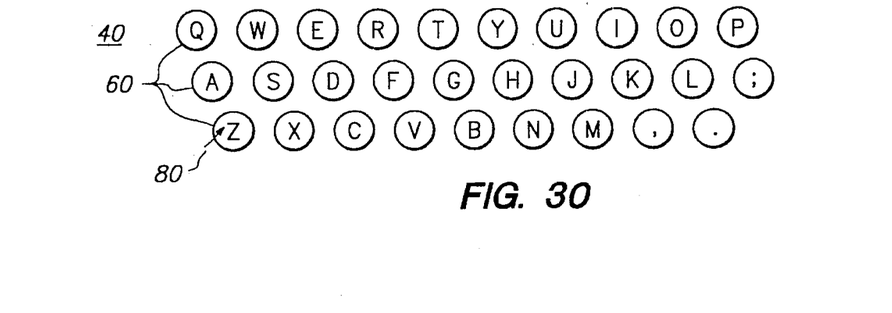

FIG. 30 shows an example of the capitalization process on an on-screen touch-sensitive qwerty keyboard. The user first touches the screen with an input device 50 the background area of the keyboard 80 in outside of a key 60 representing the letter to be capitalized. Then, without lifting the input device, 50 the user slides the input device 50 into the area of the letter key 60. This will result in the upper-case form of the letter.

Figure 31:
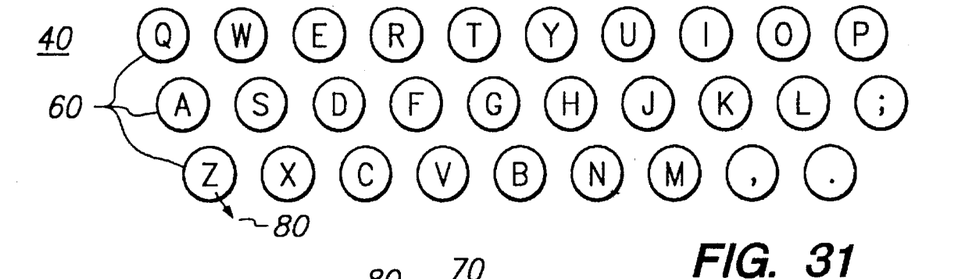

FIG. 31 shows an example of the spacing process on an on-screen touch-sensitive qwerty keyboard. Having selected the letter key 60 just before the desired space to the background area of the keyboard 80 without lifting the input device 50, the user slides the input device 50 outside of the key 60 and then lifts the input device. This motion of continuing into the background area of the keyboard 80 outside of a key 60 and then lifting the input device 50 is a way of causing a space to appear after that letter before continuing on in the input process.

Figure 32:
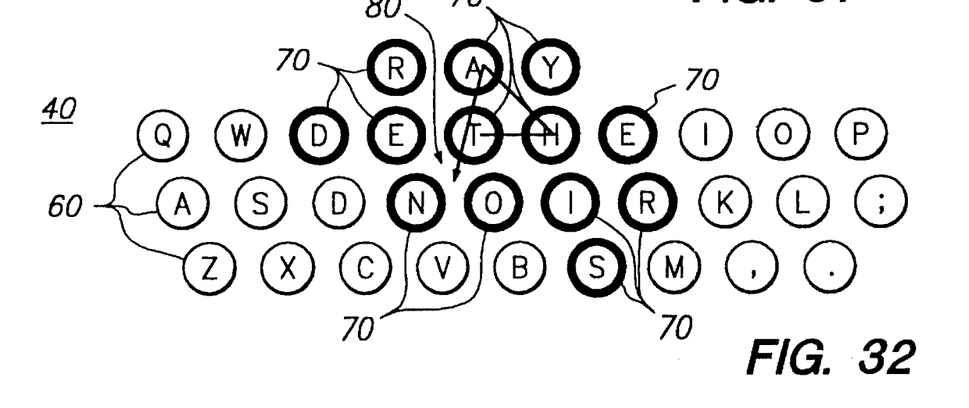
FIG. 32 shows the process of input of the word "that" on a qwerty layout using the wiping motion of the method. "That" is one of the most commonly used words in the English language.

FIG. 32 shows an example of the input of the word "that" after selecting the letter t on an on-screen touch-sensitive keyboard using the method. When t is touched with the input device, the temporarily available keys 70 that appear for use include the letters h and a. Without lifting the input device 50 from the screen, the user slides the device 50 from t into h, then into a, and then back into t. The user can then continue to slide to the background area of the keyboard 80 outside of the letter t, and lift the device 50 which will result in a space. The lines connecting the letters in this particular figure show the path of the input device to input the word "that".

Figure 33:
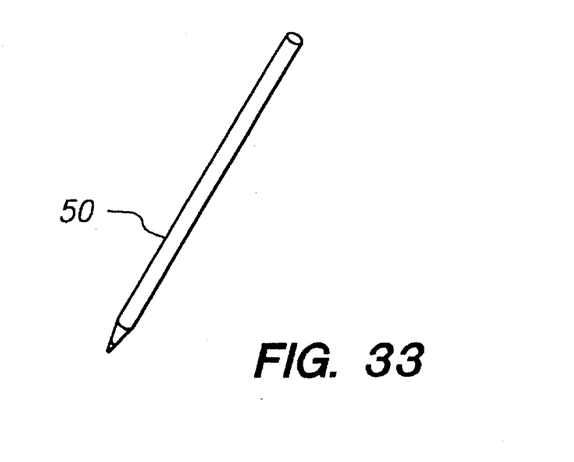
FIG. 33 shows a representation of a stylus-type of input device.

FIG. 33 shows a drawing of a stylus-type of input device 50.

Following are the benefits of this method of wiping through and into keys.

(a) The immediate presentation of the most probable next letter, letters, combination of letters, or words for selection by the user anticipates the needs of the user and increases speed of input.

(b) The speed and responsiveness of the input device coupled with the rapidity of the wiping motion, as opposed to tapping of individual letters, also increases speed.

(c) The feel of a stylus input device as it wipes the screen is a comfortable analogy to writing, as opposed to touching or striking individual keys on a hard screen with the stylus or the finger, which is uncomfortable for the user and causes fatigue in the hand.

(d) The keyboard arrangement can be changed and adapted to the users needs; it is not fixed or constrained by its physical construction. The familiarity of the "qwerty" keyboard arrangement as the basic layout, or the option of an alphabetic layout, or any other arrangement found to be of advantage to the user is always available.

(e) The repeated representation of the same most probable next letters each time a key is touched reinforces the learning process and reduces the amount of time required to learn the format of the temporary keys and also reduces the resistance on the part of the user to this new method.

(f) The methods provided for capitalization and spacing eliminate the extra step of touching a shift or caps key, or a representation of a space bar or key, making these functions easier and less disruptive to the input process.

SUMMARY, RAMIFICATIONS, AND SCOPE

Accordingly, the reader will see that the selection and wiping of keys made available based on frequency of occurrence and therefore on a most probable next basis will have the following advantages:

it anticipates the needs of the user increases the speed of input provides a method of input that is more like writing than does the method of tapping individual letters Although the description above contains many specifications, these should not be construed as limiting the scope of the invention but as merely providing illustrations of some of the presently preferred embodiments of this method. For example, the layout of the keys can have other designs, sizes, and shapes, such as differing numbers of rows and columns, differing letter and character arrangements on the basic keys, differing delineation of the temporarily active keys, different choices of letters on the temporarily active keys, changing choices of letters on the temporarily active keys, and differing arrangements of the temporarily active keys around the basic keys.

The input device may be a stylus, a finger, or any tool that works as an input device on a touch-sensitive screen. The screen may be a screen appearing on any type of computer or hand-held computer that uses a touch-sensitive screen.

Thus the scope of the method should be determined by the appended claims and their legal equivalents, rather than by the examples given.

I claim:

1. A method for data input on a touch-sensitive display, comprising the steps of:

a. displaying a keyboard arrangement on said display including at least one key individual to each of the letters comprising the standard letters of the alphabet, b. presenting on said keyboard arrangement, upon the touch of any key area corresponding to said standard letters of the alphabet, a plurality of additional temporary keys including at least one key individual to each of selected ones of letters of the same alphabet in close proximity to said key area so as to allow sliding from the touched key area into any of said temporary keys, and c. responding to the touching of any of the key areas of the keyboard arrangement and any of the said additional temporary key areas by inputting the character assigned to the touched key.

2. The method of claim 1, wherein said temporary keys include at least one key individual to each of a predetermined selection of letters that are frequently used in sequence.

3. The method of claim 1, wherein said temporary keys include at least one key individual to each of letters presented during input on a changing basis depending on letter sequences found in a word list known as a dictionary.

4. The method of claim 1, wherein said keyboard is arranged in the qwerty arrangement.

5. The method of claim 1, wherein said keyboard is arranged in alphabetic order.

6. A method for capitalization of letters during input, comprising the steps of:

a. displaying a keyboard arrangement on a touch-sensitive display including at least one key individual to each of the letters comprising the standard letters of the alphabet, b. initiating a touch on said display in an area outside of said keyboard arrangement known as the background of said keyboard arrangement with an input device of a user, c. sliding said device on the display into the area of said key, and d. responding to the touch of the key by inputting said letter in capitalized form.

7. The method of claim 6, wherein said keyboard is arranged in the qwerty arrangement.

8. The method of claim 6, wherein said keyboard is arranged in alphabetic order.

9. A method for inserting a space after the inputting of a letter during input, comprising the steps of:

a. displaying a keyboard arrangement on a touch-sensitive display including at least one key individual to each of the letters comprising the standard letters of the alphabet, b. inputting a letter by touching the area of said key with an input device of a user, c. sliding said input device on said display from the key to the area just outside of the key known as the background of said keyboard arrangement, d. lifting the input device from the surface of said display, and e. responding to the lifting of the device from the display by inputting a space.

10. The method of claim 9, wherein said keyboard is arranged in the qwerty arrangement.

11. The method of claim 9, wherein said keyboard is arranged in alphabetic order.

* * * * *